United States Patent
Jaeger et al.

(10) Patent No.: US 6,406,250 B2
(45) Date of Patent: Jun. 18, 2002

(54) METHOD OF CONVEYING TROLLIES

(76) Inventors: Steven Charles Jaeger, 5760 Smithtown Way, Shorewood, MN (US) 55331; William Arnold Grimes, 5062 Westmill Rd., Minnetonka, MN (US) 55345

(*) Notice: Subject to any disclaimer, the term of this patent is extended or adjusted under 35 U.S.C. 154(b) by 0 days.

(21) Appl. No.: 09/770,329

(22) Filed: Jan. 26, 2001

Related U.S. Application Data

(60) Provisional application No. 60/182,262, filed on Feb. 14, 2002.

(51) Int. Cl.[7] .............................. B62B 5/00; B62B 3/14; B62B 3/04
(52) U.S. Cl. .............. 414/800; 280/33.991; 280/DIG. 4
(58) Field of Search ..................... 414/800; 280/33.991, 280/DIG. 4

(56) References Cited

U.S. PATENT DOCUMENTS 5,368,281 A * 11/1994 Skyba ........................ 254/391
5,791,669 A * 8/1998 Broddon et al. ......... 280/47.34

FOREIGN PATENT DOCUMENTS

| EP | 203834 | * 12/1986 | ............ 280/33.991 |
| FR | 2581933 | * 11/1986 | ............ 280/33.991 |
| GB | 2049565 | * 12/1980 | ............ 280/33.991 |

* cited by examiner

Primary Examiner—Steven A. Bratlie
(74) Attorney, Agent, or Firm—Roger W. Jensen

(57) ABSTRACT

A method for facilitating movement of a plurality of nested trollies (including a leading trolley and a trailing trolley), the method comprising the steps of connecting an adjustable ratchet-type tension mechanism between the leading and trailing trolleys, and actuating the tension mechanism so as to produce a preselected tension between the leading and trailing trolleys to thereby hold the nested trolleys tightly together. In the preferred embodiment, the preselected tension is sufficient to upwardly the leading and trailing trolleys off of the ground surface.

2 Claims, 3 Drawing Sheets

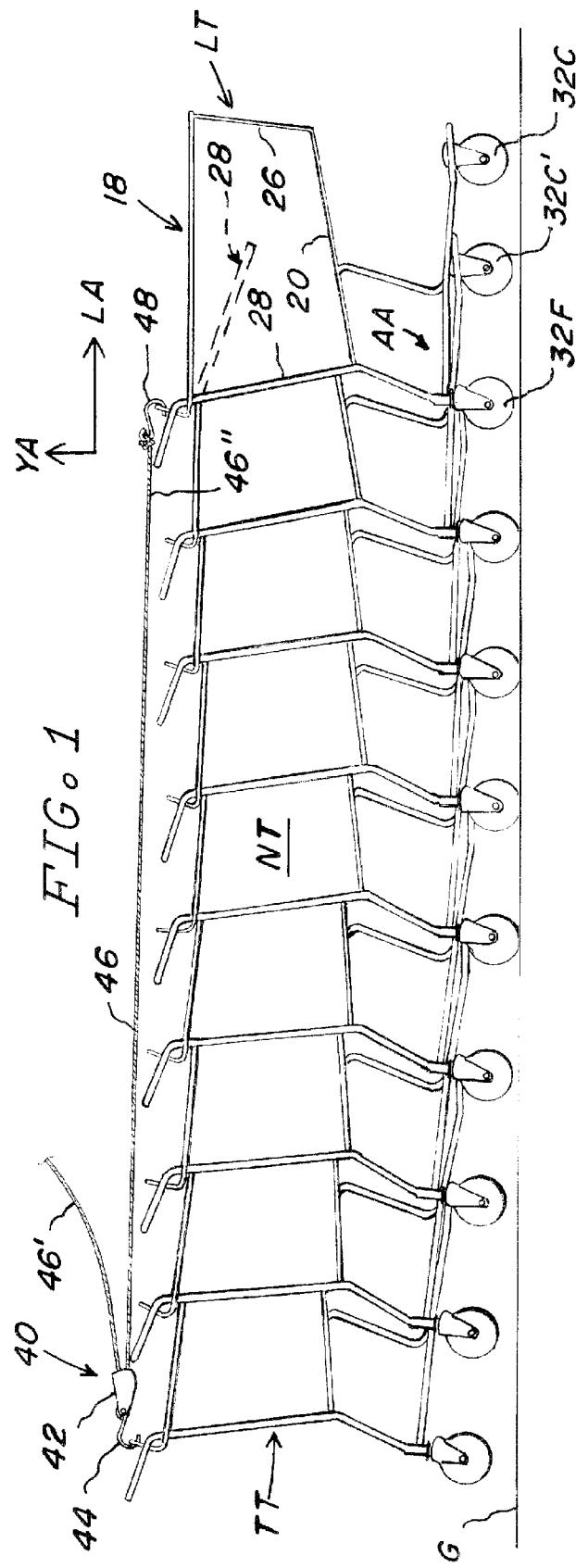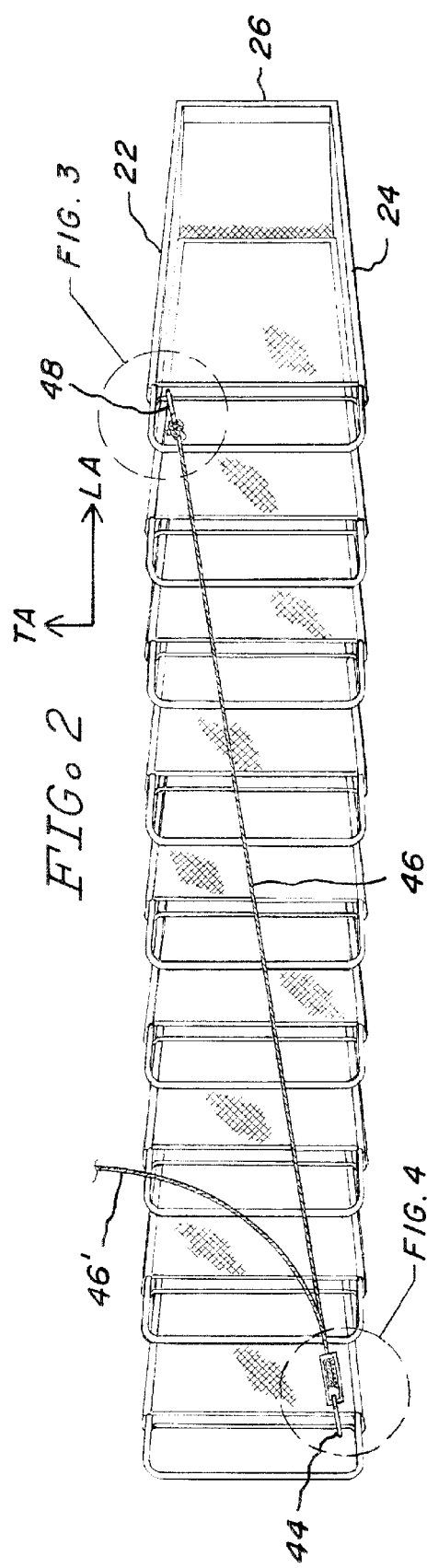

METHOD OF CONVEYING TROLLIES

CROSS REFERENCE TO RELATED APPLICATIONS

This application stems from Provisional Application Ser. No. 60/182,262, filed Feb. 14, 2000 by the applicants herein, namely Steven Charles Jaeger and William Arnold Grimes, the benefit of said earlier filing date being hereby claimed.

BACKGROUND OF THE INVENTION

1. Field of the Invention and Description of the Prior Art

This invention provides a method of facilitating the horizontal movement of a plurality of longitudinally nested trollies (shopping carts) along a ground surface which typically is horizontal, but sometimes is sloped.

Shopping carts or trollies are in widespread use by retailers and other merchants, ranging from the large superstores to the smaller businesses, so as to provide a convenience for their customers in transporting their purchased items, both within the vendor's store, as well as to transport the purchased items across a parking lot to the purchaser's vehicle. After transferring the items to the vehicle, the purchaser typically leaves the trolley either near said vehicle or sometimes in a designated shopping-cart corral.

From time to time, personnel employed by the merchant will round up carts from the parking lot; this process may employ a plurality of methods that have evolved over recent years. For purposes of efficiency, it obviously is necessary to try to return a plurality of carts to the location of origin, and this is facilitated by the design of the carts, which permits a large number of carts to be nested together, which is relatively easy. What is relatively hard is to then have the plurality of longitudinally nested carts moved in a safe, cost effective, and controlled fashion back to the point of origin. The usual procedure is to have a pushing force applied to the trailing trolley, either by manual effort or by a powered vehicle, such as a small battery-operated tractor. It is not unusual to have twenty (20) or more carts or trollies stacked together; this yields a total longitudinal length of the nested trollies of a substantial distance. The longer the string of carts, the more difficult it is to cause any turning or redirecting of the string. One manual (and expensive) technique is to have a first worker provide the pushing of the string, and a second worker at the leading trolley, forcing the leading trolley around its yaw axis so as to turn the entire string.

There even are some motorized systems which can be remote controlled so that the pushing vehicle which is remotely controlled is pushing on the trailing trolley and the operator, using a remote-control device, is at the front end of the string (i.e., at the leading trolley), wherein he or she may not only control the tractor, but also manually try to change the heading of the leading trolley so as to try to get the entire string headed correctly for the point of origin. One of these prior art schemes is shown in U.S. Pat. No. 5,322,306.

There are several economic factors which apply to this issue. First of all, the shopping carts per se are quite expensive. Any merchant must, for practicality, have only a reasonable number of carts available to its business, regard also being given to the size of the storage area, or point of origin, where the merchant's customers pick up the shopping cart in the first instance. The shopping carts almost exclusively use rather expensive wheels, usually fabricated from high-density plastic, which function well when rolling around their normal rotational axis, but which can be easily damaged if skidded sideways sometimes on the parking lot surface. This will, in extreme cases, cause a serious flat sector on the wheel, which makes the cart customer unfriendly; thus an expensive repair is necessitated. Labor costs associated with the actual rounding-up of carts is very significant. This is especially so when two workers are required to bring a string of carts back to the point of origin. If tractors without remote control are used, then two workers frequently are required. If tractors with remote control are used, then at least one worker will be needed.

Furthermore, it is not unusual, regard being given to factors such as snow and rain, as well as reckless employees, to have property damage, e.g., to carts, customer vehicles, etc., or personal injuries to employees, customers, or others.

In brief summary, systems of the type described typically require a very large investment in the carts or trollies, and incur a high ongoing labor and insurance expense to cover the above scenarios.

SUMMARY OF THE INVENTION

In broad terms, the present invention provides a method for facilitating the horizontal movement of a plurality of longitudinally nested trollies, including a leading trolley and a trailing trolley, where the method comprises the steps of:
i) connecting an adjustable ratchet-type tension mechanism between the leading and trailing trolleys;
ii) actuating the tension mechanism so as to produce a preselected tension between the leading and trailing trolleys to thereby hold the plurality of nested trollies tightly together.

In the preferred embodiment of the invention, the preselected tension causes at least the leading and trailing trolleys to be lifted upwardly relative to the ground surface, so that preselected wheels thereof are actually spaced from the ground surface. This simple but extremely effective method then permits the entire string of trolleys to be more easily moved, both along the longitudinal axis, as well as to be rotated about the yaw axis or gravity, to change the heading of a string of carts.

BRIEF DESCRIPTION OF THE DRAWINGS

FIG. 1 shows a plurality of longitudinally nested trolleys or carts, and an adjustable ratchet-type tension mechanism which comprises in part a rope and hooks, which are connected between the leading and trailing carts, and with the rope being under tension so that preselected wheels of the carts at the leading and trailing ends of the string are actually lifted upwardly, out of contact with the ground.

FIG. 2 shows in plan view the plurality or string of carts shown in FIG. 1.

DETAILED DESCRIPTION OF THE INVENTION

Figure 3:
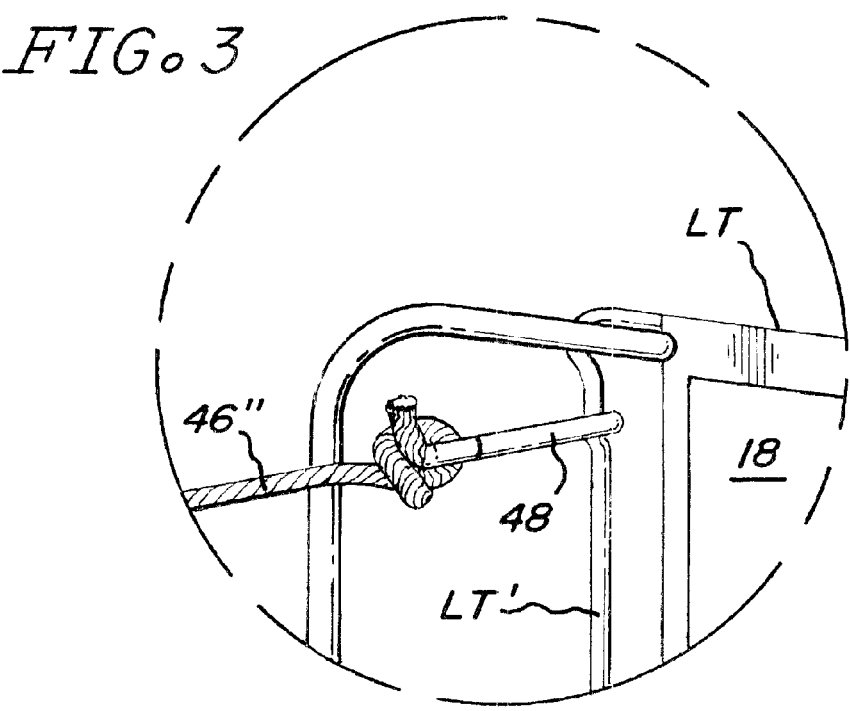
FIG. 3 shows an enlarged view of a detail from FIG. 2 of the connection of the rope/hook to one rear corner of the leading cart.

FIG. 1 shows a side elevation of a plurality of longitudinally-nested trollies NT, including a leading trolley LT and a trailing trolley TT; the figure shows a schematic representation of the longitudinal axis LA, as well as the yaw axis YA of the plurality or string of carts or trollies. In FIG. 1, the transverse axis of the string is perpendicular to the plane of paper. FIG. 2 shows the top view of the carts shown in FIG. 1; again, the longitudinal axis LA is depicted and, for this view, the transverse axis TA is depicted.

Referring again to FIG. 1, it is intended that all of the carts depicted would be substantially identical to one another, comprising an open top 18, a bottom 20, a left side 22, a right side 24, a front 26, and a rear 28 panel. As seen in FIG. 2, the overall configuration of the cart is rectangular, although the rear panel 28 has a greater transverse length than that of the front panel 26, producing a tapered configuration which is almost universal in shopping carts so as to permit the nesting together. The nesting is also facilitated by the back panel 28 being pivoted at the top, as is shown in FIG. 1, so that it may move (as shown in FIG. 1) counterclockwise, so as to permit the front end of next adjacent cart to move into the cart in the well-known nested fashion. Each cart further has a supporting undercarriage AA which, in turn, is supported for horizontal movement by forward-located caster-type wheels 32C and rearward located fixed-axis wheels 32F.

It should be emphasized that prior art methods of horizontally moving a plurality of longitudinally-nested trollies would have all of the wheels of all of the carts in direct engagement with the ground G. For purposes of explaining the present invention, it will be noted that the wheels 32C and 32F of the leading trolley LT, as well as a front wheel 32C' of the next adjacent trolley, and that all of the wheels of both the trailing trolley and the trolley adjacent thereto are shown off of the ground G. This upward lifting of the wheels can be accomplished easily and inexpensively by the use of an adjustable ratchet-type tension mechanism connected between the leading and trailing trolleys, and then increasing the tension to the point, not only to hold the plurality of longitudinally trolleys tightly together, but also to, in the preferred embodiment, lift the wheels of the trailing and leading trollies off of the ground as it depicted in FIG. 1.

Figure 4:
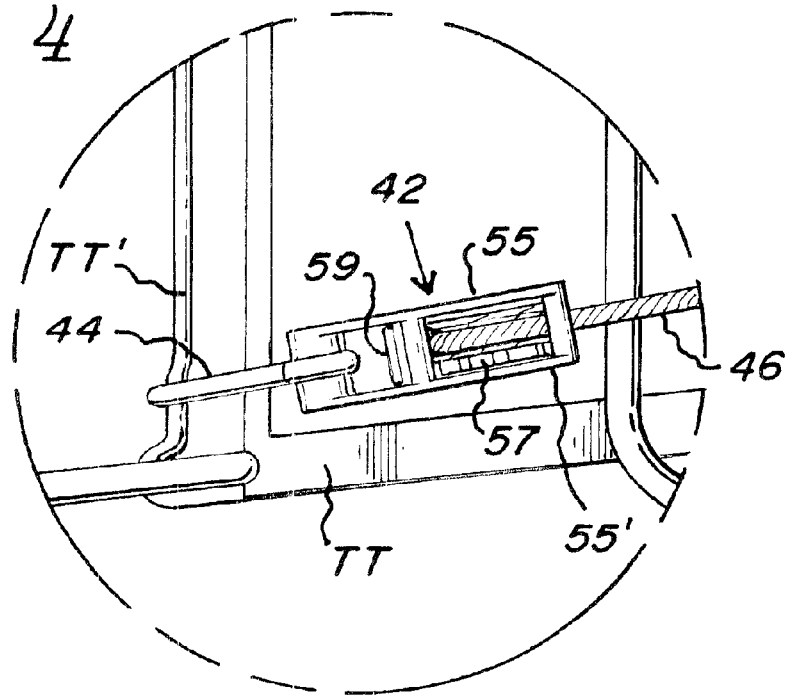
FIG. 4 shows an enlarged view of a detail from FIG. 2 showing the hook/ratchet/rope attached to an opposite rear corner of the trailing cart.

The adjustable ratchet-type tension means of the preferred embodiment of the invention comprises a ratchet pulley 40, such as is described in detail in U.S. Pat. No. 5,368,281 (herein incorporated by reference) which comprises a housing member 42 (see FIGS. 1 and 4) having a pair of spaced-apart side members 55 and 55' which support for rotation a sprocket 57 which co-acts with a spring-loaded ratchet mechanism 59 to permit a rope 46 to co-act therewith, as will be explained below. The housing 42 has at its left end thereof, as is shown in FIG. 1, a hook 44 which is adapted to be connected to one of the rear corners TT' of trailing cart TT, as is clearly shown in FIG. 4. One end 46' of rope 46 is passed around the sprocket wheel 57, while the other end of the rope 46" is connected via a hook 48 to an opposite rear corner T' of the leading trolley LT.

Operation

Figure 5:
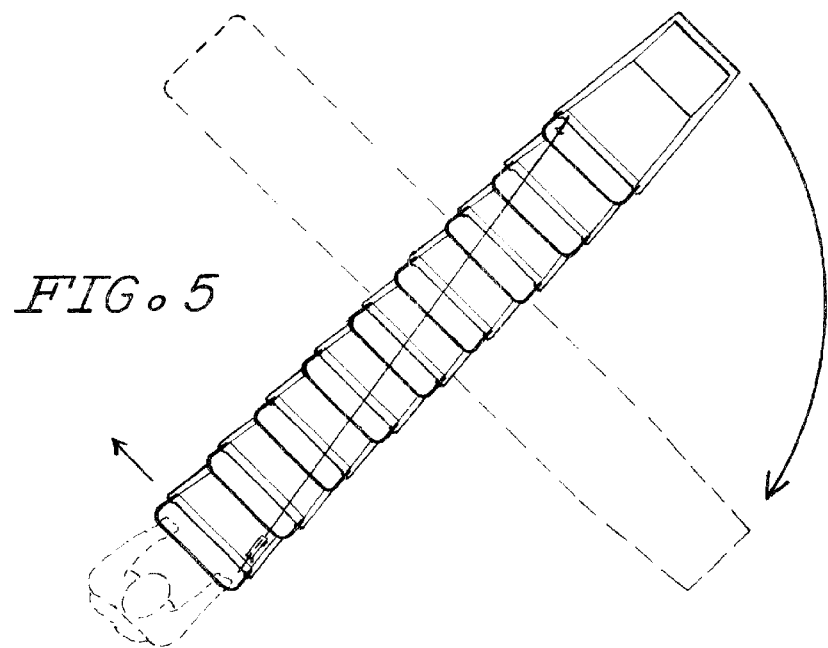
FIG. 5 shows how an entire string of carts nested together and under tension as aforesaid can be rotated about the yaw axis of the string, the illustration showing an approximate 90-degree rotation clockwise.

The present invention provides a method of facilitating the horizontal movement of a plurality of carts very efficiently. A single worker would first nest the carts somewhat as shown in FIG. 1, and then apply the hook 44 and 48 as shown, following which the end 46' of the rope is manually pulled to produce tension between the housing 42 and the leading cart LT. The worker will soon achieve a desired tension in the rope 46 so as to, as a minimum, move all of the nested carts tightly together and, with some upward lifting force being applied to the leading and trailing trollies LT and TT respectively. As indicated, the preferred embodiment of the inventive method is to have sufficient tension in the rope 46 so as to actually have spacing of preselected wheels from the ground, such as is shown in FIG. 1; this makes it much easier to push the nested carts horizontally, i.e., takes less force, and further permits rather easy rotation of the string of carts about its yaw axis YA without destructive damage to the wheels as aforesaid. Such rotation about the yaw axis YA is clearly depicted in FIG. 5, wherein the worker is applying a reasonable amount of force to the left, as depicted, thus causing a clockwise rotation of the entire string of nested carts. It is easy to achieve a 90-degree rotation.

Figure 7:
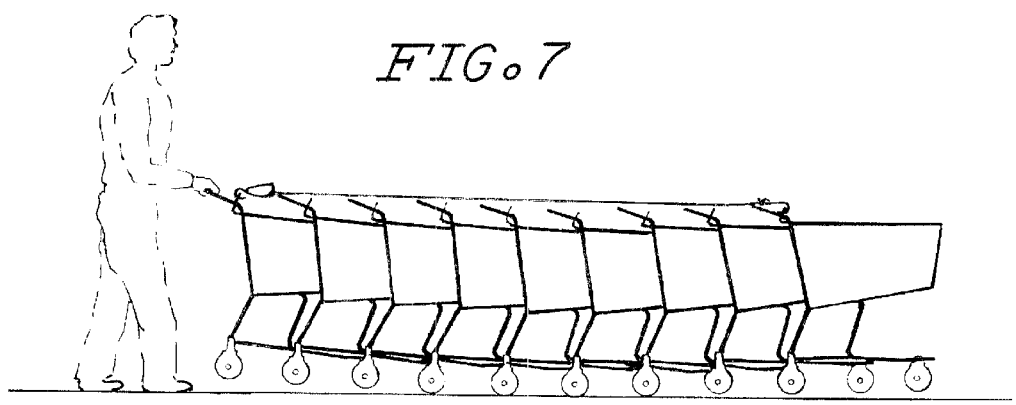
FIG. 7 shows the nested carts being moved manually.
Figure 6:
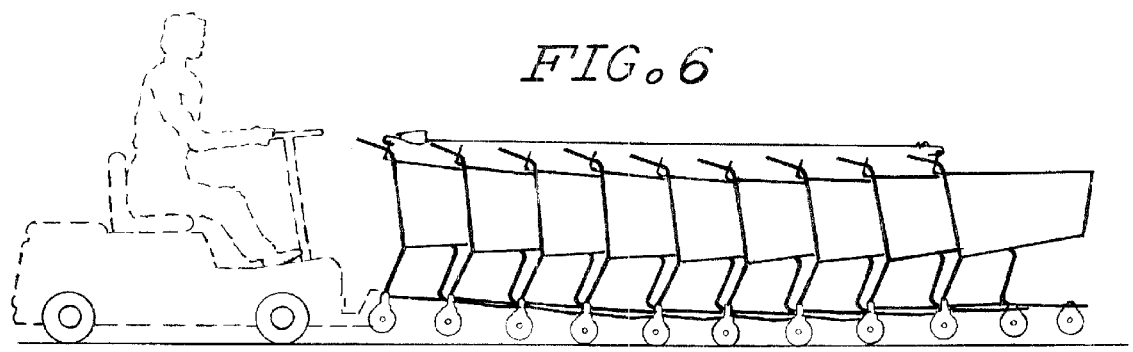
FIG. 6 shows how the string of nested carts may be moved along the ground surface by a motorized means.

FIG. 6 shows how the nested carts with raised wheels can be moved horizontally by a motorized means. FIG. 7 shows the same arrangement with the carts being manually moved.

Once the string of carts has been returned to the desired drop-off point, or point of origin, the tension mechanism can be easily removed by tipping the trailing cart up slightly so as to relieve tension in the rope, and then actuating the release tab 59 of the sprocket mechanism. This will allow enough rope to pull through the ratchet so as to reduce the tension to zero, following which the hooks 44 and 48 can be removed from the string. The method of the present invention is to be clearly distinguished over prior art methods wherein ropes would be used to move together a string of nested carts, one end of the rope being connected to the leading cart, and the other end of the rope being held by the worker at the other end of the string, i.e., at the trailing cart, holding the rope in one hand and trying to push the string of carts with the other hand. This method frequently produces rope burns, cuts, etc., with attendant physical pain.

Another aspect of this invention is that the method may be used to pull a line of shopping carts out of the cart corral or enclosure. This is done by casting the loose end of the rope with hook 48, and snagging any portion of the forward or leading corralled cart, and pulling several carts out in a nested position. Without the rope and hook, the worker would try to reach over the back of the carts and pull perhaps two carts backward; anything more than two is difficult to maneuver within the corral.

When using a motorized remote controlled shopping cart pushing system, the present invention can be used for a means for holding the shopping carts secured together. Thus, the line of shopping carts are secured together, allowing the entire line of carts to be stopped by the braking system of the motorized remote-controlled cart system, that otherwise would be stopped by the operator applying sufficient force on the front cart to keep the carts nested together and stopped. Since the operator is walking in front of the lead cart to steer and stop the line, it also prevents the carts from separating if the person operating the machine walks faster than the machine is pushing the line. It will be understood that the method of the present invention may also be utilized by a motorized shopping cart pulling system.

While the preferred embodiment of the invention has been illustrated, it will be understood that variations may be made by those skilled in the art without departing from the inventive concept. Accordingly, the invention is to be limited only by the scope of the following claims.

I claim:

1. The method of facilitating the horizontal movement of plurality of longitudinally nested trolleys (including a leading trolley, intermediate trolleys, and a trailing trolley) along a ground surface wherein each of said trolleys comprises a top generally-rectangularly-shaped cargo compartment defined by an open top, and bottom, left side, right side, front and back panels and being longitudinally tapered with back panel having a preselected tranverse extent greater than a preselected transverse extent of said front panel and said back panel at the top thereof being pivotally supported for rotation about a transverse axis so as to permit the front end of another trolley to nest within said cargo compartment, each of said trolleys being further characterized by having a supporting undercarriage which, in turn, is supported for horizontal movement by forward located castor-type wheels and rearward located fixed axis wheels connted thereto, the method comprising the following steps:

a. attaching a rope-type ratchet tension mechanism between said leading and trailing trolleys of said plurality of longitudinally nested trolleys, and
 b. actuating said rope-type ratchet tension mechanism so as to produce a preselected tension between said leading and trailing trolleys to thereby (i) hold said plurality of longitudinally nested trolleys tightly together; and (ii) cause at least said leading and trailing trolleys to be lifted upwardly with respect to said ground surface to space preselected wheels thereof from said ground surface, whereby said plurality of nested trolleys (i) will be supported solely by said intermediate trolleys being in contact with said ground surface; and (ii) may be moved with respect to said ground surface by manual or motorized means.

2. The method of facilitating the horizontal movement of a plurality of longitudinally nested trolleys (including a leading trolley, intermediate trolleys, and trailing trolley) along a ground surface wherein each of said trolleys comprises a top generally-rectangularly-shaped cargo compartment defined by an open top, and bottom, left side, right side, front and back panels and being longitudinally tapered with said back panel having a preselected transverse extent greater than a preselected transverse extent of said front panel and said back panel at the top thereof being pivotally supported for rotation about transverse axis so as to permit the front end of another trolley to nest within said cargo compartment, each of said trolleys being further characterized by having a supporting undercarriage which, in turn, is supported for horizontal movement by forward located castor-type wheels and rearward located fixed axis wheels connected thereto, the method comprising the following steps:

a. attaching a rope-type ratchet tension mechanism between said leading and trailing trolleys of said plurality of longitudinally nested trolleys, and
 b. actuating said rope-type ratchet tension mechanism so as to produce a preselected tension between said leading and trailing trolleys to thereby (i) hold said plurality of longitudinally nested trolley tightly together; and (ii) apply an upward force to at least said leading and trailing trolleys away from said ground surface to reduce the pressure of preselected wheels thereof on said ground surface.

* * * * *